(12) United States Patent
Mayer

(10) Patent No.: US 8,120,701 B2
(45) Date of Patent: Feb. 21, 2012

(54) MODULAR PORTABLE MOTION CONTROL SYSTEM

(76) Inventor: Stewart Ray Mayer, Dallas County, TX (US)

( * ) Notice: Subject to any disclaimer, the term of this patent is extended or adjusted under 35 U.S.C. 154(b) by 564 days.

(21) Appl. No.: 12/157,852

(22) Filed: Jun. 13, 2008

(65) Prior Publication Data

US 2009/0309986 A1 Dec. 17, 2009

(51) Int. Cl.
*H04N 5/225* (2006.01)

(52) U.S. Cl. ......... 348/373; 348/374; 348/375; 348/376

(58) Field of Classification Search .......... 348/373–376; 352/53, 243

See application file for complete search history.

(56) References Cited

U.S. PATENT DOCUMENTS 6,520,642 B1 * 2/2003 Chapman ..................... 352/243

* cited by examiner

*Primary Examiner* — Yogesh Aggarwal
(74) *Attorney, Agent, or Firm* — W. Thomas Timmons

(57) ABSTRACT

A modular portable motion control camera system includes one or more motion control blocks that are connected together directly to each other, connected together with connecting hardware, or connected to other equipment to be moved by the motion control block to create robotic camera control systems. Each motion control block has its own mechanics, servo motor, control circuitry, and interface connections. The motion control blocks are networked together and controlled with a computer running custom motion control software to allow complex individual or synchronous control. Each motion control block includes a body with a rotating motorized plate. Inside the body each motion control block has its own motor control circuitry, servo motor, and gears to bring motion from the motor to the rotating motorized plate. Electrical connectors are inserted into the body to provide all the necessary electrical connections. Mounting tabs on each end of the body have evenly spaced threaded holes and countersunk through holes. Through these mounting tabs and holes, the motion control block easily mounts to other motion control blocks, to accessories, or to anything object or equipment user wishes to attach it to. The rotating motorized plate has threaded mounting holes and alignment grooves so that other parts and accessories can be easily attached and aligned.

6 Claims, 5 Drawing Sheets

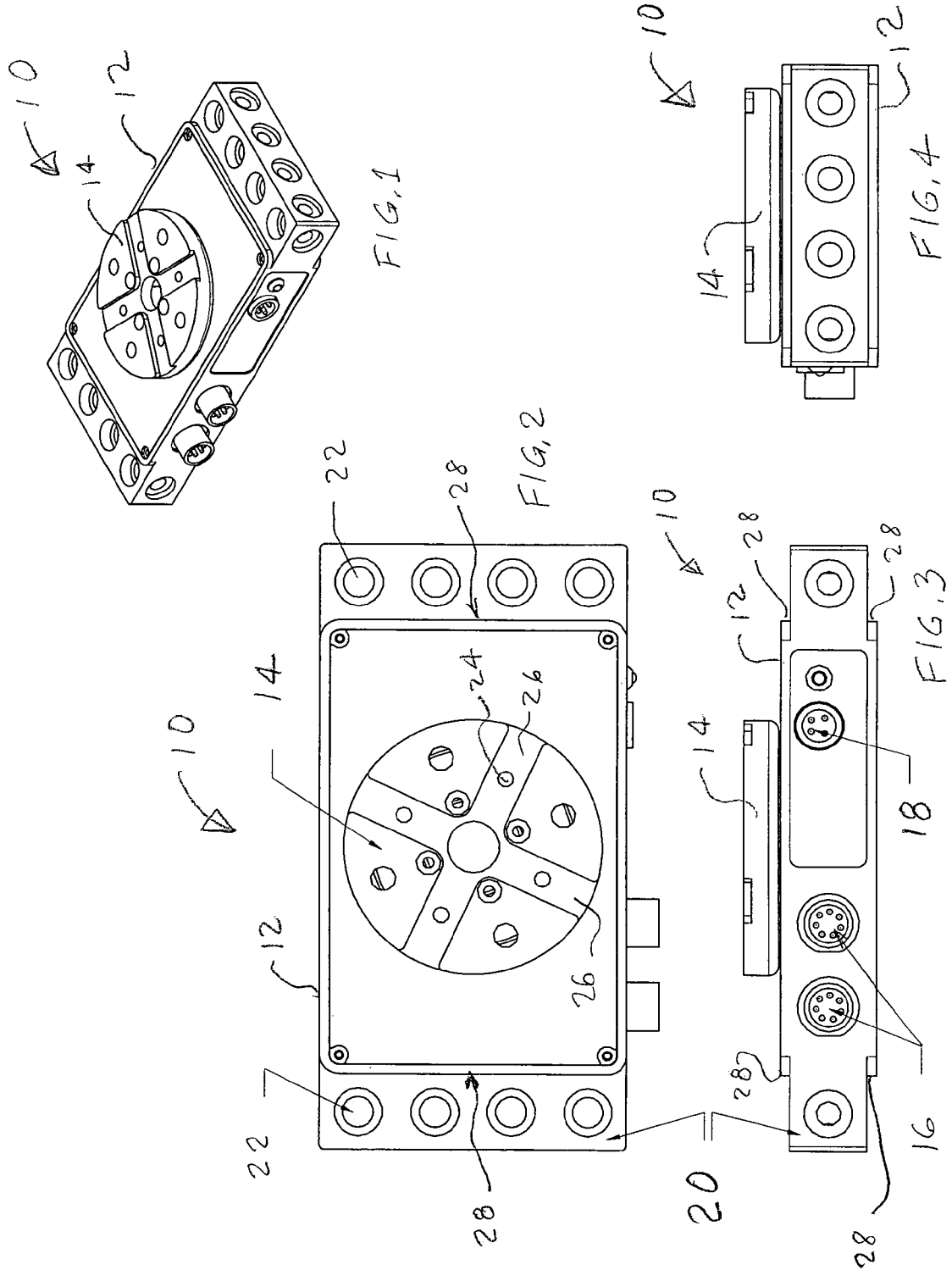

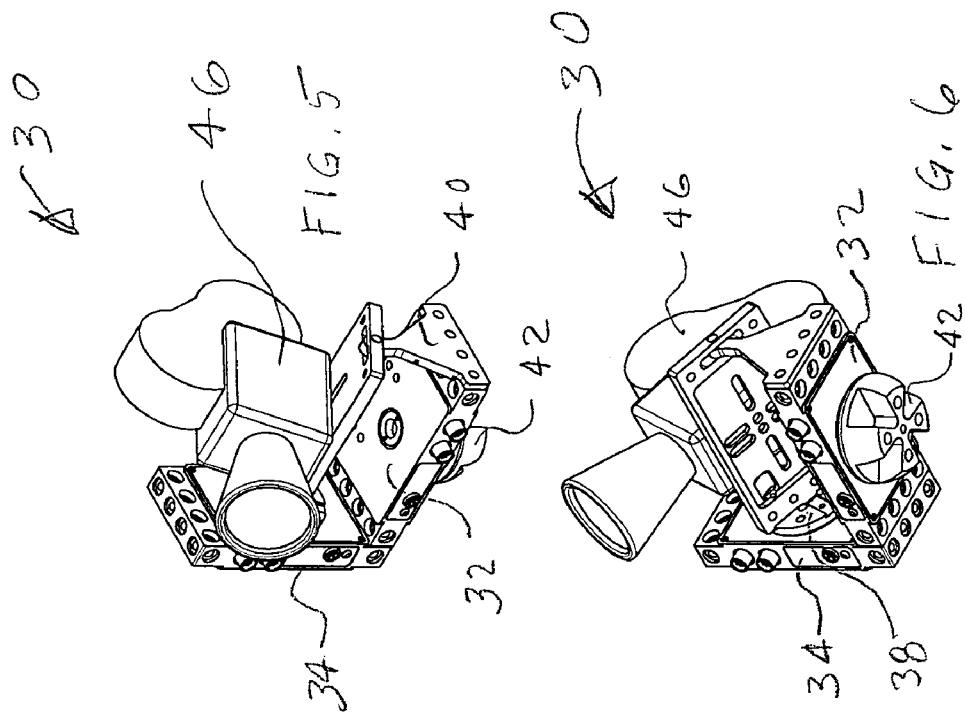
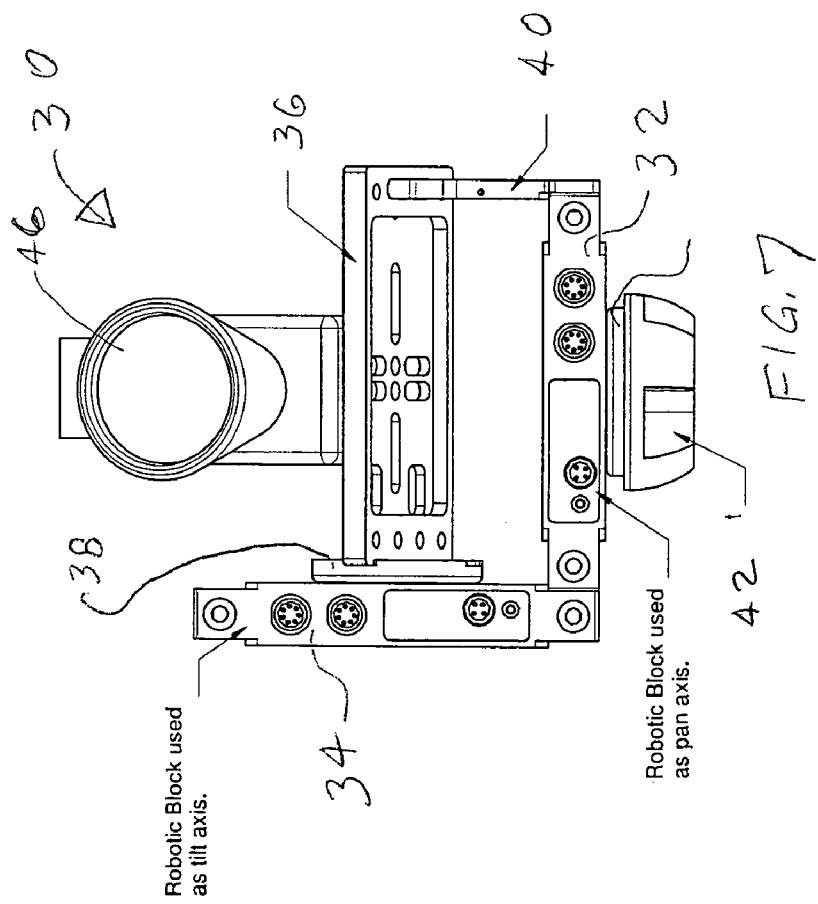

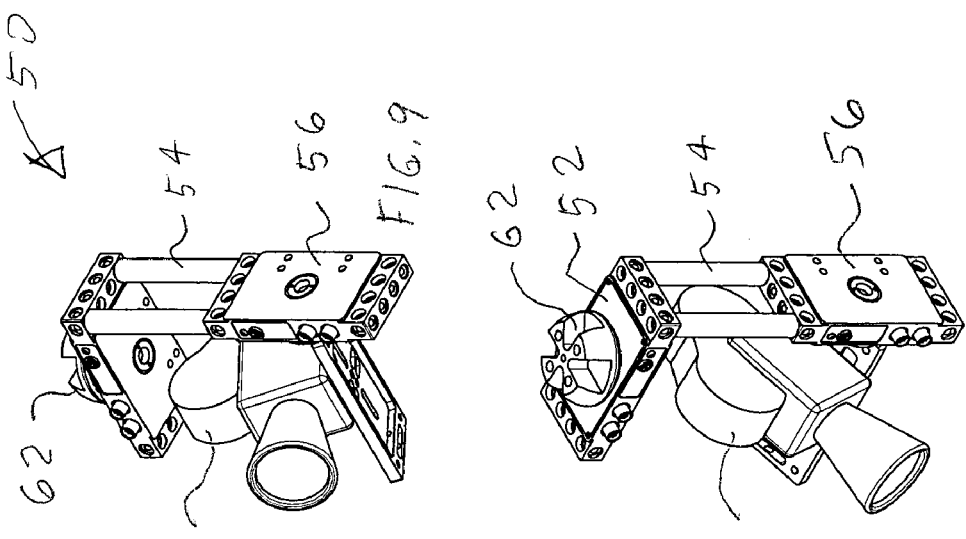
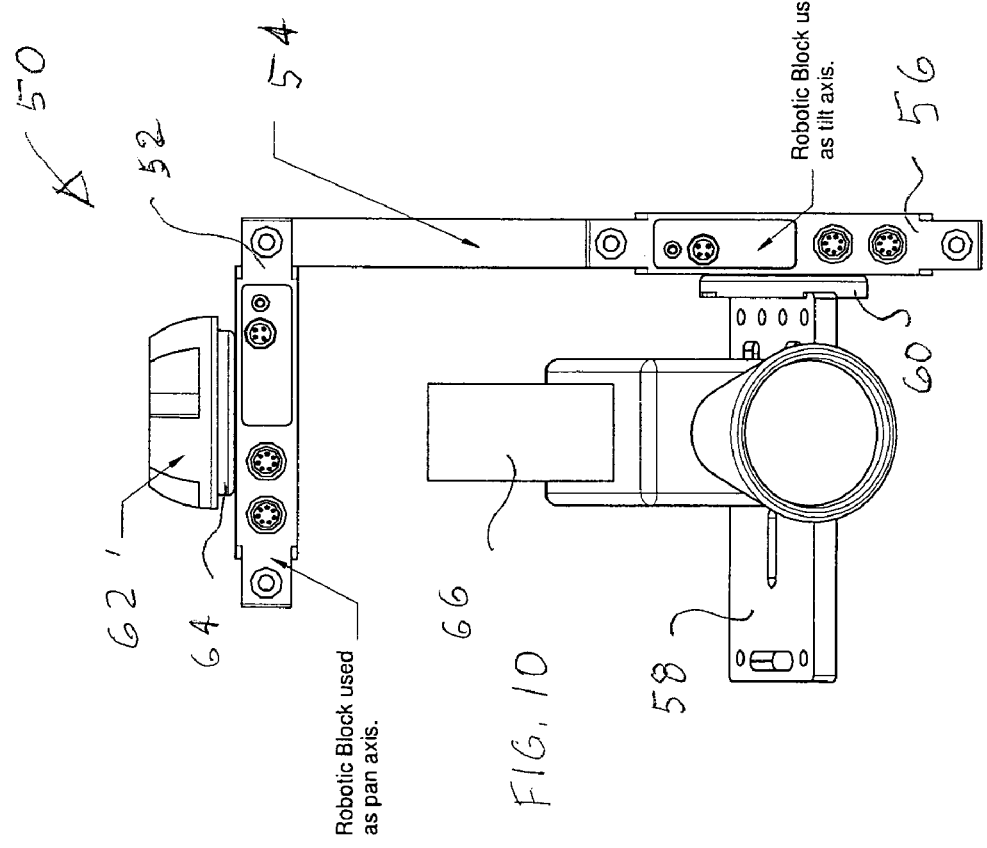

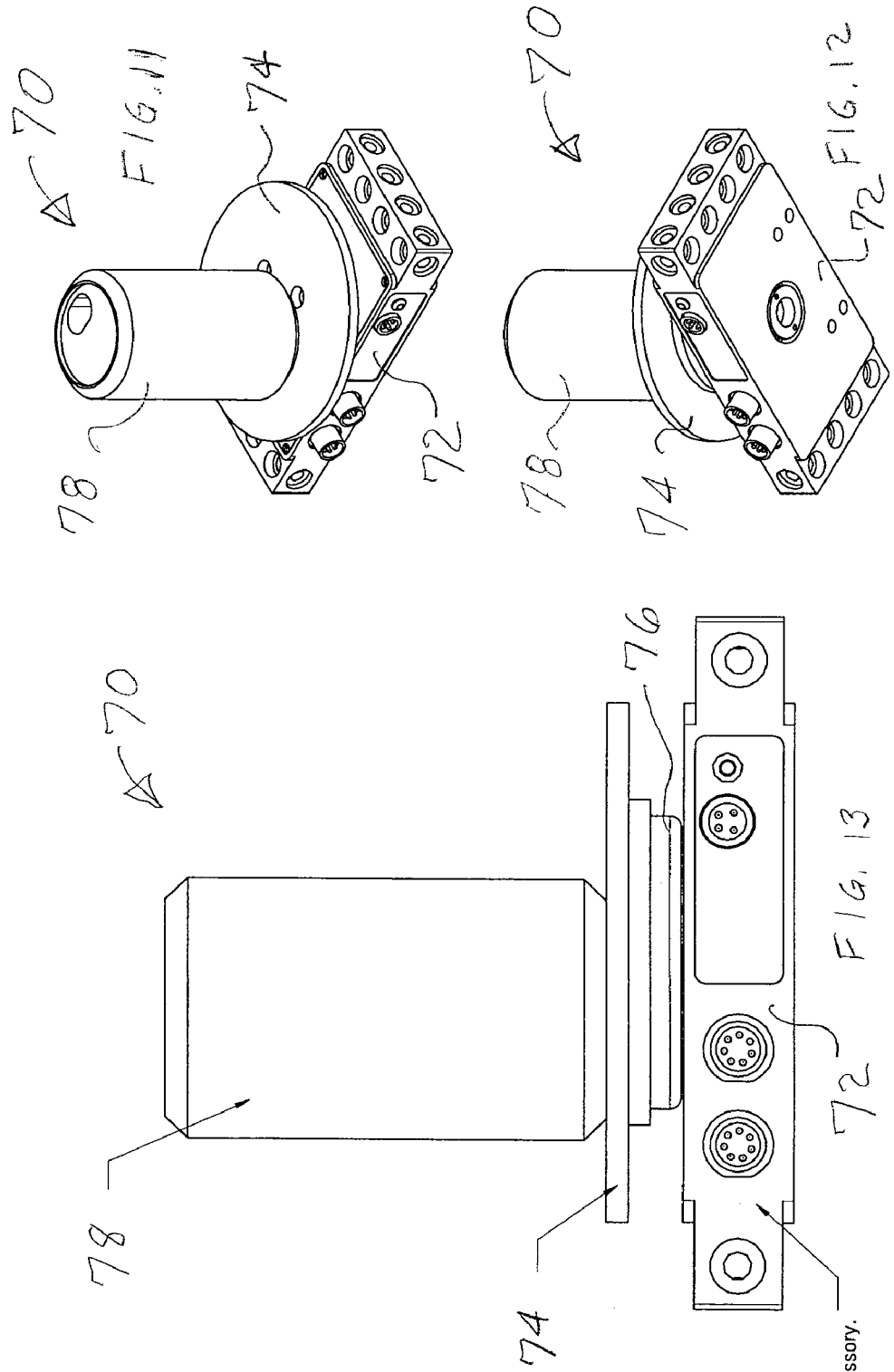

MODULAR PORTABLE MOTION CONTROL SYSTEM

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates generally to motion systems, and in one of its aspects to such a system for use with motion picture cameras.

2. Description of Related Art

There have been numerous specially constructed dollies and rail systems for motion picture cameras. There have also been specially constructed camera supports for use with booms or jib arms. Each of these has been completed constructed for a special use. The present invention differs sharply from such systems since it is entirely modular and can be quickly put together for all kinds of special uses.

BRIEF SUMMARY OF THE INVENTION

A modular portable motion control system according to the present invention brings light weight motion control capabilities to camera systems in a flexible and scalable manner using only one complex part, a motion control block, and simple accessories. Multiple motion control blocks can be connected together in many different configurations to achieve many different uses and are controlled synchronously to form simple to complex motion control systems. The modular portable motion control camera system is different from existing motion control camera systems because of its flexibility. The motion control block can take on many uses instead of having a dedicated use.

The modular portable motion control camera system includes one or more motion control blocks that are connected together directly to each other, connected together with connecting hardware, or connected to other equipment to be moved by the motion control block to create robotic camera control systems. Each motion control block has its own mechanics, servo motor, control circuitry, and interface connections. The motion control blocks are networked together and controlled with a computer running custom motion control software to allow complex individual or synchronous control.

Each motion control block includes a body with a rotating motorized plate. Inside the body each motion control block has its own motor control circuitry, servo motor, and gears to bring motion from the motor to the rotating motorized plate. Electrical connectors are inserted into the body to provide all the necessary electrical connections. Mounting tabs on each end of the body have evenly spaced threaded holes and countersunk through holes. Through these mounting tabs and holes, the motion control block easily mounts to other motion control blocks, to accessories, or to anything object or equipment user wishes to attach it to. The rotating motorized plate has threaded mounting holes and alignment grooves so that other parts and accessories can be easily attached and aligned.

The key to the modular portable motion control camera system is its ability to take many shapes and therefore many uses in photography, cinematography, videography, or any form of image capture. Using a single motion control block and connecting hardware many functions can be achieved such as a camera pan axis, tilt axis, roll axis, dolly, tabletop prop mover, and more. Two motion control blocks can be configured to work as a pan/tilt head, an under slung pan/tilt head, dolly with pan, dolly with tilt, and more. Three motion control blocks can be configured to operate as a pan/tilt head with dolly, dolly with table top prop movers, and more. Multiple blocks can be controlled in a system allowing for many different configurations depending on the needs of the user.

The portable modular motion control camera system is used to control the movement of cameras, camera positioning equipment, props, or other objects used in photography, cinematography, videography, or any form of image capture. The user can control the position and velocity of the motors independently or synchronously over time repeatably and accurately through the computer interface. This is often used in time lapse photography, compositing, green screen effects, moving product shots, model and miniature photography, and many more scenarios.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 1 is a top front right perspective view of a motion control block according to the present invention;

FIG. 2 is a top view of the motion control block of FIG. 1;

FIG. 3 is a front elevation view of the motion control block of FIG. 1;

FIG. 4 is a right side elevation view of the motion control block of FIG. 1;

FIG. 5 is a top front right perspective view of a modular portable motion control camera system according to the present invention with a camera mounted above the support;

FIG. 6 is a bottom front right perspective view of the modular portable motion control camera system of FIG. 5;

FIG. 7 is a front elevation view of the modular portable motion control camera system of FIG. 5;

FIG. 8 is a top front right perspective view of a modular portable motion control camera system according to the present invention with a camera mounted below the support;

FIG. 9 is a bottom front right perspective view of the modular portable motion control camera system of FIG. 8;

FIG. 10 is a front elevation view of the modular portable motion control camera system of FIG. 8;

FIG. 11 is a top front right perspective view of a modular portable motion control system according to the present invention configured as a rotation table;

FIG. 12 is a bottom front right perspective view of the modular portable motion control system of FIG. 11;

FIG. 13 is a front elevation view of the modular portable motion control system of FIG. 11;

DETAILED DESCRIPTION OF THE INVENTION

Figure 15:
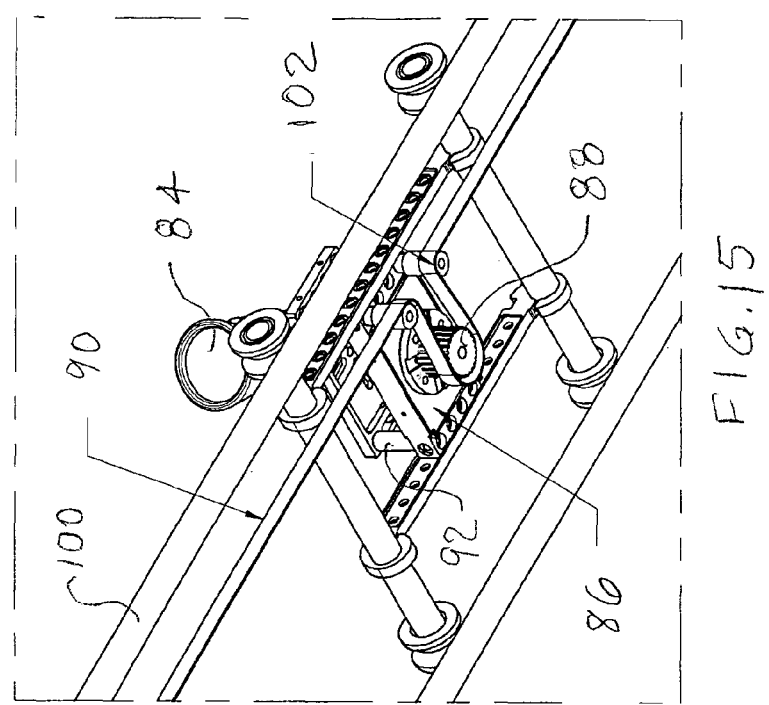
FIG. 15 is a bottom right front perspective view of the modular motion control system of FIG. 14.

Referring now to the drawing and in particular to FIGS. 1 through 4, a motion control block according to the present invention is referred to generally by reference numeral 10 includes a body 12 with a rotating motorized plate 14. Inside the body each motion control block has its own motor control circuitry, servo motor, and gears, all of which are well known in the industry and are off the shelf items, to bring motion from the motor to the rotating motorized plate. Electrical connectors are inserted into the body to provide all the necessary electrical connections, including control cable connectors 16 and limit switch connector 18. These are traditional connectors, but they could also be wireless. Mounting tabs 20 on each end of the body have evenly spaced threaded holes 22 and countersunk through holes. Through these mounting tabs and holes, the motion control block easily mounts to other motion control blocks, to accessories, or to anything object or equipment user wishes to attach it to. Mounting tabs 20 have shoulders 28 for aligning other motion control blocks or other items to be connected. The rotating motorized plate has threaded mounting holes 24 and alignment grooves 26 so that other parts and accessories can be easily attached and aligned.

Referring now to FIGS. 5 through 7, a modular portable motion control system according to the present invention is referred to generally by reference numeral 30 includes a first motion control block 32 and a second motion control block 34 that are connected together directly to each other. Each motion control block is the same as the motion control block shown in FIGS. 1 through 4 and already described. A mounting plate 36 is connected to motorized plate 38 of second motion control block 34. A mounting plate support bracket 40 is connected to first motion control block 32 on the opposite end from second motion control block 34. A mount 42 is connected to motorized plate 44, which is underneath first motion control block 32 for connection to a tripod or boom or other support. A camera 46 is mounted on top of support plate 36. It is now easy to see that with such an arrangement, first motion control block 32 acts as the pan axis for camera 46, and second motion control block 34 acts as the tilt axis. Each motion control block has its own mechanics, servo motor, control circuitry, and interface connections. The motion control blocks are networked together and controlled with a computer running custom motion control software to allow complex individual or synchronous control.

Referring to FIGS. 8 through 10, another embodiment of a modular portable motion control system according to the present invention is referred to generally by reference numeral 50 includes a first motion control block 52 connected together with connecting hardware, namely extension tubes 54 to second motion control block 56. Each motion control block is the same as the motion control block shown in FIGS. 1 through 4 and already described. A mounting plate 58 is connected to motorized plate 60 of second motion control block 56. A mount 62 is connected to motorized plate 64, which is above first motion control block 52 for connection to a jib arm or other support. A camera 66 is mounted on top of support plate 58. It is now easy to see that with such an arrangement, first motion control block 52 acts as the pan axis for camera 66, and second motion control block 56 acts as the tilt axis.

Referring to FIGS. 11 through 13, another arrangement of a modular portable motion control system is referred to generally by reference numeral 70. Modular portable motion control system 70 includes a single motion control block 72. A rotation table 74 is attached to motorized plate 76, and an object to be displayed or filmed such as cold drink can 78 is positioned off-center on rotation table 74 so that it moves in addition to turning. This is a case in which motion control block 72 is connected to other equipment to be moved by the motion control block to create a robotic control system.

The key to the modular portable motion control camera system is its ability to take many shapes and therefore uses. Using a single motion control block and connecting hardware many functions can be achieved such as a camera pan axis, tilt axis, roll axis, dolly, tabletop prop mover, and more. Two motion control blocks can be configured to work as a pan/tilt head, an under slung pan/tilt head, dolly with pan, dolly with tilt, and more. Three motion control blocks can be configured to operate as a pan/tilt head with dolly, dolly with table top prop movers, and more. Multiple blocks can be controlled in a system allowing for many different configurations depending on the needs of the user.

Figure 14:
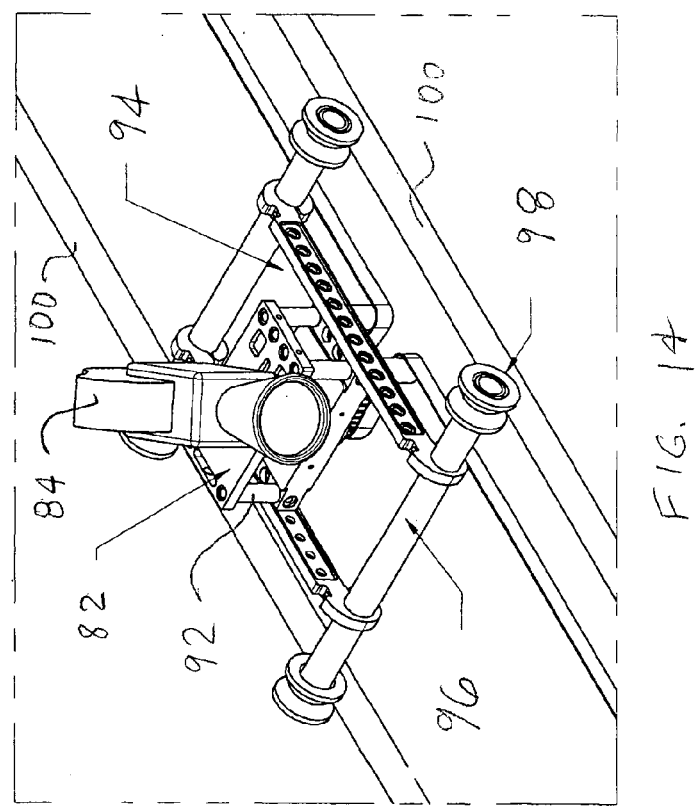
FIG. 14 is a top right front perspective view of a modular motion control system according to the present invention configured for a dolly or rail.

Referring now to FIGS. 14 and 15, a modular motion control system configured for a dolly or rail is referred to generally by reference numeral 80. Modular motion control system 80 includes an upper motion control block 82 which controls the angle of a camera 84 and a lower motion control block 86 with a drive 88 affixed to motorized plate 89 for belt 90. Lower motion control block 86 is connected to upper motion control block 82 by posts 92. Lower motion control block 86 is connected to and supported by axel brackets 94, and axel brackets 94 are supported by wheel axels 96. V-groove wheels 98 ride on rails 100. Belt 90 loops drive 88 by way of idler pulleys 102. Motorized plate 89 thus moves the camera along the rail through drive 88 and belt 90.

The portable modular motion control camera system is used to control the movement of cameras, camera positioning equipment, props, or other objects used in photography, cinematography, videography, or any form of image capture. The user can control the position and velocity of the motors independently or synchronously over time repeatably and accurately through the computer interface. This is often used in time lapse photography, compositing, green screen effects, moving product shots, model and miniature photography, and many more scenarios.

A modular portable motion control system according to the present invention brings light weight motion control capabilities to camera systems in a flexible and scalable manner using only one complex part, a motion control block, and simple accessories. Multiple motion control blocks can be connected together in many different configurations to achieve many different uses and are controlled synchronously to form simple to complex motion control systems. The modular portable motion control camera system is different from existing motion control camera systems because of its flexibility. The motion control block can take on many uses instead of having a dedicated use.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A motion control block comprising in combination:
a motorized plate;
a servo motor for rotating the motorized plate;
control circuitry for controlling the servo motor; and
interface connections for connecting to other motion control blocks, wherein the interface connections form mounting tabs with shoulders at the ends of the motion control block, wherein the shoulders align other motion control blocks for connecting.

2. A motion control block according to claim 1 for use with mounting bolts and accessories, wherein the mounting tabs form threaded holes for mounting bolts and accessories.

3. A motion control block according to claim 1 for use with mounting bolts and accessories, wherein the mounting tabs form countersunk holes for mounting bolts and accessories.

4. A motion control block for use with rails and wheels suitable for moving along the rails, comprising in combination:
a motorized plate;
a servo motor for rotating the motorized plate;
control circuitry for controlling the servo motor; and
interface connections for connecting to other motion control blocks, wherein the interface connections form mounting tabs with shoulders at the ends of the motion control block, wherein the shoulders align other motion control blocks for connecting, and wherein the wheels are mounted on a frame which allows for motion along the rails and wherein the interface connections are also for connecting to the frame, whereby the motion control block moves with the frame and wheels along the rails.

5. A motion control block according to claim 4 for use with mounting bolts and accessories, wherein the mounting tabs form threaded holes for mounting bolts and accessories.

6. A motion control block according to claim 4 for use with mounting bolts and accessories, wherein the mounting tabs form countersunk holes for mounting bolts and accessories.

* * * * *